July 9, 1929.  C. L. McCUEN  1,720,084
APPARATUS FOR PURIFYING LUBRICATING OIL
Filed Sept. 24, 1924  2 Sheets-Sheet 1

Inventor
Charles L. McCuen
By
Attorneys

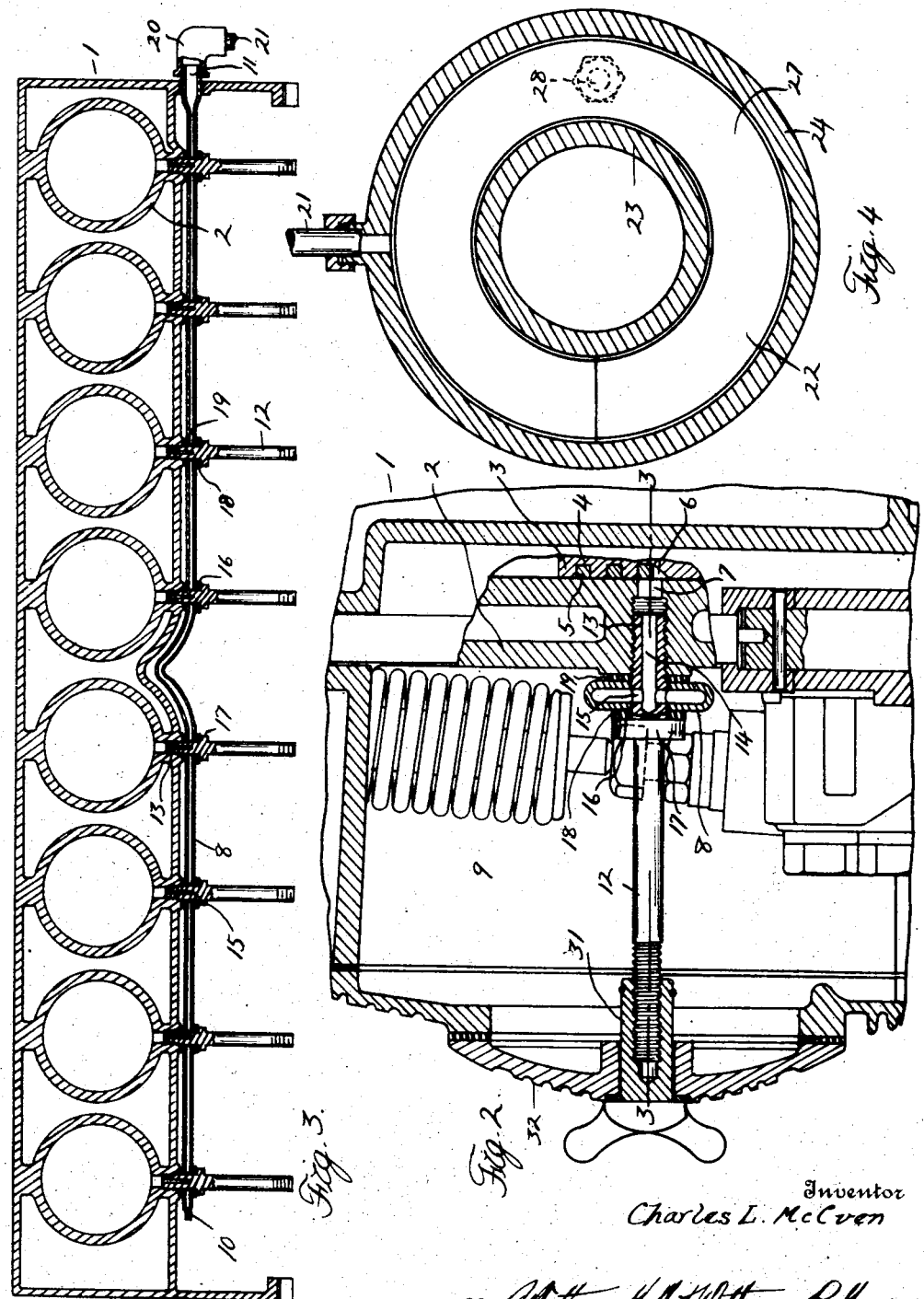

Patented July 9, 1929.

1,720,084

UNITED STATES PATENT OFFICE.

CHARLES L. McCUEN, OF DETROIT, MICHIGAN, ASSIGNOR TO PERFECTION ENGINEERING COMPANY, OF DETROIT, MICHIGAN, A CORPORATION OF MICHIGAN.

APPARATUS FOR PURIFYING LUBRICATING OIL.

Application filed September 24, 1924. Serial No. 739,660.

The invention relates to an apparatus for purifying lubricating oil and is particularly applicable to an apparatus for purifying the lubricating oil of an internal combustion engine. One of the objects of the invention is the provision of an improved apparatus including a conduit for conducting the lubricating oil from the engine cylinder walls. Another object is the provision of a simple device for securing the conduit in place and at the same time placing this conduit in communication with the ports in the cylinder walls. A further object is the provision of a device which in addition to securing the conduit in place secures in place a cover plate for the engine.

With these as well as other objects in view the invention resides in the novel features of construction and combinations and arrangements of parts as more fully hereinafter set forth.

In the drawings:

Figure 2 is a transverse cross section therethrough;

Figure 3 is a cross section on the line 3—3 of Figure 2;

Figure 4 is a cross section on the line 4—4 of Figure 1.

Figure 1:
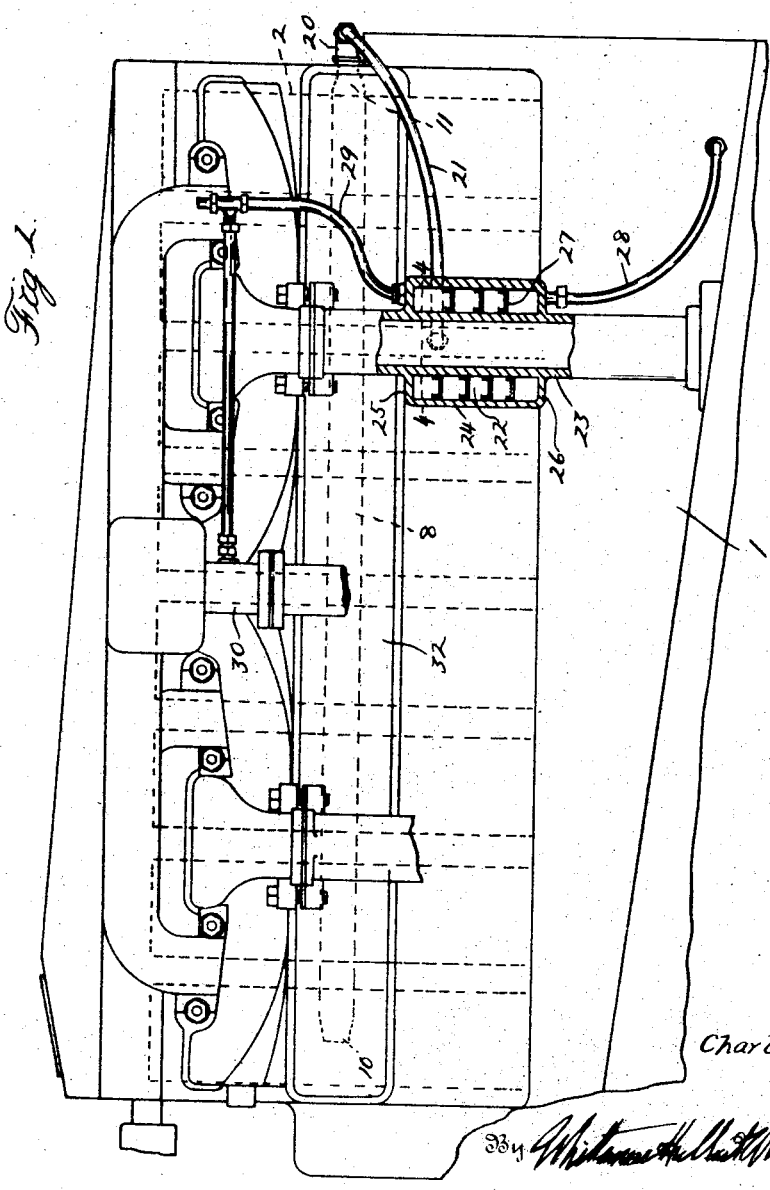
Figure 1 is a side elevation, partly in section, of a portion of an internal combustion engine embodying an apparatus for purifying the lubricating oil.

1 is an internal combustion engine having a series of cylinders 2 in each of which a piston 3 is reciprocable. Each piston is provided with the annular grooves 4 for receiving the piston rings 5, one of the grooves having a tapered lower portion 6 which upon the downward stroke of the piston registers with the port 7 in the wall of its respective cylinder.

To conduct the lubricating oil, which has collected in the tapered groove portion 6, I have provided the conduit 8 which is preferably formed of tubing and extends longitudinally of the engine within the valve tappet chamber 9. This conduit has a closed front end 10 and a threaded rear end 11 and with the exception of the rear end is flattened throughout its length, as shown particularly in Figure 2. For placing the conduit 8 in communication with the ports 7 of the cylinders walls, I have provided the studs 12 having inner end portions 13 extending through the conduit 8 and threadedly engaging the cylinder walls, each inner end portion being provided with the longitudinally extended bore or passageway 14 and the aligned transverse bores or passageways 15, which latter register with the interior of the conduit 8. These studs 12 also secure the conduit in place, each stud having the shoulder 16 formed by the enlargement 17 upon the stud and located at the outer side of the conduit. Suitable packings 18 and 19 are provided respectively at the outer and inner sides of the conduit and surrounding the inner end portion 13 of the stud to prevent the lubricating oil from leaking out between the conduit and the inner end portion of the stud.

The rear end 11 of the conduit 8 extends outwardly through the rear end of the engine 1 and has threaded thereupon the fitting 20 which is connected with one end of the discharge pipe 21, the other end of which is connected with the vaporizing chamber 22. This chamber surrounds the exhaust pipe 23 of the engine and is formed by a portion of the wall of the exhaust pipe and a surrounding wall 24 spaced from and preferably integral with the wall of the exhaust pipe. Both the upper and lower ends of the chamber are closed by the upper and lower walls 25 and 26 respectively, the latter of which is preferably integral with the wall 24 and the wall of the exhaust pipe 23. The discharge pipe 21 preferably opens into the chamber 22 at its upper end and for the purpose of directing the lubricating oil through a circuitous path within the chamber, I have provided the spirally arranged trough or channel 27 which is coiled around the wall of the exhaust pipe. For conducting the oil after it has passed through the chamber 22 to the crank case of the engine, I have provided the pipe 28 which is connected with the lower end of the chamber.

For removing the volatile diluents of the lubricating oil, such as gasoline, kerosene and the like, which have been vaporized during the passage through the chamber 22 there is the suction pipe 29 which is connected with the upper end of the chamber 22 and with the intake manifold 30 of the engine.

The outer ends of the studs 12 are preferably threaded for engagement by the nuts 31 which latter secure the cover plate 32 of the valve tappet chamber 9 in place.

From the above description it will be readily seen that I have provided a simple construction of apparatus for removing the diluents of the lubricating oil. Also that I have provided a simple compact construction which may be cheaply manufactured for conducting the lubricating oil from the cylinder walls. Furthermore it will be seen that I have provided a securing means for the lubricating oil conducting conduit which also functions to place this conduit in communication with the ports in the cylinder walls and which additionally functions in securing the cover plate of the valve tappet chamber in place.

What I claim as my invention is:

1. The combination with a cylinder having a port in the wall thereof, of a conduit at one side of said cylinder and a common means for securing said conduit to said cylinder and for placing said conduit in communication with the port thereof and for securing a cover on the valve tappet chamber of said cylinder.

2. The combination with a cylinder having a port in the wall thereof, of a conduit at one side of said cylinder, a stud extending transversely through said conduit having a threaded portion engaging the wall of said cylinder and provided with a passageway opening into said conduit for placing the interior of said conduit in communication with the port of said cylinder, and a shoulder upon said stud for securing said conduit to the wall of said cylinder.

3. In an internal combustion engine, the combination with a plurality of cylinders having ports in the walls thereof, a chamber at one side of said cylinders and a cover plate for said chamber, of a conduit extending longitudinally of the engine within said chamber and communicating with the ports in the walls of said cylinders and a common means for securing said cover plate and conduit in place.

4. In an internal combustion engine, the combination with a plurality of cylinders having ports in the walls thereof, of a conduit extending longitudinally of the engine at one side of said cylinders, studs having portions extending through said conduit and threadedly engaging in the walls of said cylinders and provided with passageways for placing the ports of the cylinder walls in communication with the interior of said conduit, and means upon said studs for securing said conduit in place.

5. In an internal combustion engine, the combination with a plurality of cylinders having ports in the walls thereof, a chamber at one side of said cylinders and a cover plate for said chamber, of a flattened conduit within said chamber and extending longitudinally of the engine, studs having portions extending through said conduit and threadedly engaging the walls of said cylinders, said portions having passageways for placing the interior of said conduit in communication with ports of the cylinder walls, shoulders upon said studs for securing said conduit in place, and means threadedly engaging said studs for securing said cover in place.

6. In an internal combustion engine, the combination with a cylinder having a port in the wall whereof, a crank case, an intake manifold and an exhaust pipe, of a conduit in communication with said port, a chamber surrounding said exhaust pipe, a connection between the upper end of said chamber and said conduit, a spiral trough arranged within said chamber, a pipe leading from the lower end of said chamber to said crank case, and a second pipe leading from the upper end of said chamber to said intake manifold.

7. In an internal combustion engine a vaporizer for removing volatile diluents from the lubricating oil for the engine comprising a pipe for conducting exhaust gases of the engine from the cylinders thereof and a trough spirally formed within said vaporizer about the exhaust pipe, means for conducting lubricant to said trough, and means for conducting away from the vaporizer the volatile diluents vaporized under the influence of the exhaust gases passing through the exhaust pipe.

8. The combination with a plurality of cylinders having ports in the walls thereof and having valve operating tappets adjacent the outer walls, of a flattened conduit extending between said tappets and cylinder walls, and means for securing said conduit in communication with said ports, said conduit having its major axis extending substantially in the direction of the axis of the cylinders.

9. The combination with a plurality of cylinders having ports in the walls thereof, and having valve operating tappets adjacent the outer walls, of a flattened conduit extending between said tappets and cylinder walls, and means for securing said conduit in communication with said ports through one of its broad wall portions, the inner and outer of said broad wall portions being positioned adjacent said cylinder walls and tappets respectively.

In testimony whereof I affix my signature.

CHARLES L. McCUEN.